US007259319B2

(12) United States Patent
Oba et al.

(10) Patent No.: US 7,259,319 B2
(45) Date of Patent: Aug. 21, 2007

(54) PERFORMANCE OPERATOR CONTROL APPARATUS

(75) Inventors: Yasuhiko Oba, Hamamatsu (JP); Yuji Fujiwara, Hamamatsu (JP); Tomoyuki Ura, Hamamatsu (JP); Tadaharu Kato, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 190 days.

(21) Appl. No.: 11/010,445

(22) Filed: Dec. 14, 2004

(65) Prior Publication Data

US 2005/0132871 A1 Jun. 23, 2005

(30) Foreign Application Priority Data

Dec. 17, 2003 (JP) ............................. 2003-419311
Dec. 17, 2003 (JP) ............................. 2003-419312
Jan. 9, 2004 (JP) ............................. 2004-004569

(51) Int. Cl.
*G01H 1/32* (2006.01)
*G01H 3/00* (2006.01)

(52) U.S. Cl. .......................................... 84/744; 84/723

(58) Field of Classification Search ..................... None
See application file for complete search history.

(56) References Cited

U.S. PATENT DOCUMENTS 5,291,011 A * 3/1994 Mantani .................. 250/208.3
5,345,181 A 9/1994 Mantani et al.
5,922,983 A 7/1999 Muramatsu
6,121,535 A 9/2000 Muramatsu
6,737,571 B2 * 5/2004 Furukawa .................... 84/610
2002/0156509 A1 10/2002 Cheung

FOREIGN PATENT DOCUMENTS

JP 05-152127 6/1993
JP 10-177378 6/1998

* cited by examiner

*Primary Examiner*—Marlon Fletcher
(74) *Attorney, Agent, or Firm*—Dickstein, Shapiro, LLP.

(57) ABSTRACT

A performance operator control apparatus adapted to a player piano comprises a motion control unit and a key drive unit comprising a plurality of key I/O control ICs in connection with keys of a keyboard, which are driven by solenoids so as to realize automatic performance, wherein upon detection of electrification abnormality of solenoids or temperature abnormality, LEDs are turned on to indicate the abnormality. The key I/O control ICs receive velocity signals regarding the solenoids so as to perform feedback controls on the keys in the automatic performance. In addition, unoccupied channels of the key I/O control ICs, which are not assigned to the keys and sensors, are used to input monitoring signals and to output inspection signals. Herein, the abnormality is determined based on the difference between pre-inspection data and post-inspection data, which are transferred using a loop connection channel of the key I/O control IC.

12 Claims, 6 Drawing Sheets

PERFORMANCE OPERATOR CONTROL APPARATUS

BACKGROUND OF THE INVENTION

1. Field of the Invention

This invention relates to performance operator control apparatuses for controlling various types of apparatuses equipped with performance operators, such as keyboard instruments (e.g., player pianos), which allow users to generate acoustic sounds by depressing keys for striking strings, which allow users to record musical tone data such as MIDI (i.e., Musical Instrument Digital Interface) data, and which are capable of playing automatic performance using acoustic sounds by driving keys based on musical tone data, and multidimensional performance control apparatuses (e.g., music playing devices and game playing devices), which are equipped with performance operators for performing drive controls on musical performance and which are equipped with other types of operators such as joysticks for performing drive controls on musical performance in a multidimensional manner.

This application claims priority on Japanese Patent Applications Nos. 2003-419311, 2003-419312, and 2004-4569, the contents of which are incorporated herein by reference.

2. Description of the Related Art

Conventionally, player pianos (or automatic performance pianos) are each designed to simulate acoustic pianos in which key motions are transmitted to hammers via action mechanisms so that strings are struck by hammers to produce acoustic sounds, wherein they are equipped with solenoids for electronically driving keys and operator I/O control units for controlling electrification with regard to solenoids. For example, when keys are driven using solenoids, an operator I/O control unit turns on or off transistors by drive signals (e.g., PWM signals, namely, pulse-width modulated signals), so that the solenoids are supplied with drive currents (or PWM currents) via transistors. They can be also equipped with feedback controls for driving keys. Japanese Patent Application Publication No. H05-152127 discloses a solenoid abnormality detection circuit for detecting abnormal operation of a solenoid, which upon detection of a short-circuit event (or a semi-short-circuit event) of a transistor, prevents an abnormal current from being supplied to the solenoid, wherein a control circuit inhibits electrification from being applied to the solenoid in response to an abnormality detection signal. In addition, Japanese Patent Application Publication No. H10-177378 discloses a key-touch response control apparatus (or a key-touch sensation control apparatus) that controls reactions of keys when they are depressed and that drives keys (or other performance operators) to play a musical performance.

The aforementioned solenoid abnormality detection circuit may require specific lines for transmitting signals representing the abnormality to the control circuit to inhibit electrification from being applied to the solenoid. This unnecessarily increases the overall area of a circuit board and the total number of lines adapted to a keyboard. Similar problems may occur due to the necessity of the 'specifically designed' control circuit. This problem occurs not only in the solenoid abnormality detection circuit detecting the abnormality but in the other circuitry using the configuration for detecting internal monitoring signals, for example, in the circuitry for detecting the temperature of a circuit board of a keyboard so as to output a temperature detection signal to a control circuit and the like.

In addition, the solenoid abnormality detection circuit must be designed such that the abnormality content can be easily determined in order to conduct maintenance for coping with the abnormality. It may be possible to display some message when the control circuit receives an abnormality detection signal, wherein the control circuit must be designed to output signals representing the abnormality to a display circuit and the like. This may require specific lines for transmitting signals representing the abnormality, which in turn unnecessarily increases the overall area of a circuit board and the number of lines adapted to a keyboard. Similar problems may occur due to the necessity of the 'specifically designed' control circuit. Normally, it is convenient for users that while an automatic performance is in progress, the temperature control is performed to monitor the temperature of a circuit board of a keyboard, thus notifying users of the occurrence of the temperature abnormality. In addition, it is convenient for users to confirm the occurrence of sensor signals being output from key sensors, hammer sensors, and pedal sensors during the automated drive of keys and/or pedals being automatically operated based on performance data or during the manual drive of keys and/or pedals being manually operated by the player. This also requires specific lines for transmitting signals representing the sensor output, which in turn unnecessarily increases the overall area of a circuit board and the number of lines adapted to the keyboard. That is, the aforementioned modification adapted to the conventional technology causes complication in circuit configurations, which in turn increases the probability that an error may occur in a certain part of the circuitry, whereby it becomes very difficult to precisely notify users of the occurrence of the abnormality.

In addition, the aforementioned operator I/O control unit is constituted by a plurality of integrated circuits (or ICs) having numerous output ports, which output drive signals for driving the prescribed number of keys, and numerous input ports, which input feedback signals regarding servo controls from velocity sensors of solenoids. It may be necessary to perform inspection as to whether or not ICs operate normally; however, the provision of a 'specifically designed' inspection circuit increases the overall area of a circuit board and the number of lines adapted to a keyboard.

SUMMARY OF THE INVENTION

It is an object of the invention to provide a performance operator control apparatus, which allows an operator I/O control unit having numerous ports to effectively use internal monitoring signals regarding key motions in a player piano and the like without increasing the overall area of a circuit board and the number of lines adapted to a keyboard.

It is another object of the invention to provide a performance operator control circuit having an operator I/O control unit, which allows an internal control circuit thereof to output indicator signals, sensor signals, and inspection signals without increasing the overall area of a circuit board and the number of lines adapted to a keyboard.

It is a further object of the invention to provide a performance operator control apparatus having an operator I/O control unit comprising ICs having numerous ports, which allows inspection to be performed on ICs with ease, regardless of conditions of ports whether they are operating or not.

In a first aspect of the invention, a performance operator control apparatus comprises one or a plurality of performance operators; a plurality of sensors that are attached to the performance operators so as to detect physical parameters regarding the operations of the performance operators;

a control unit circuit for performing calculations to produce drive data for driving the performance operators based on the physical parameters; and an operator I/O control unit comprising a plurality of ICs each having an input port and an output port with respect to a plurality of channels, wherein the operator I/O control unit sends the physical parameters from the sensors to the control unit circuit, and wherein at least one channel of the input port that is not assigned to any one of the performance operators is used to input a monitoring signal.

In the above, the control unit circuit detects the operations of the performance operators through communication with the operator I/O control unit via lines. That is, the 'existing' lines regarding ICs of the operator I/O control unit, which is designed for the performance operator control apparatus adapted to a player piano, can be used for communication of monitoring signals; therefore, it is possible to prevent the overall area of a circuit board and the total number of lines arranged for the performance operator control apparatus from being increased so much. In addition, it is possible to commonly share the same control routine of the software for controlling the entry of data and signals with the detection of the operation of the performance operator; that is, it is possible to simplify the software; hence, it is possible to reduce the burden of processing with regard to a CPU and the like. By using unoccupied channels that are not assigned to the performance operators (e.g., keys), it is possible to receive a variety of monitoring signals, which can be selected by the software.

In the case of the player piano in which keys are driven by solenoids respectively electrified based on drive data (or performance data), it is possible to list a variety of monitoring signals such as abnormality detection signals representing the electrification abnormality of solenoids, temperature detection signals representing the temperature of the operator I/O control unit, voltage detection signals representing the detected voltage of a drive power source for driving solenoids, and signals representing the user's manipulation of performance operators as well as sensor signals given from key sensors, hammer sensors; and pedal sensors. In the player piano, it is necessary to precisely set the distances between keys and solenoids in order that plungers of solenoids will not interrupt key motions in a manual performance mode. That is, a relatively high precision in assembly is required with respect to the height direction of the keyboard (matching the moving direction of the plunger). Therefore, it is possible to further incorporate 'optical' distance sensors in the keyboard so that distance detection signals can be used as monitoring signals in an assembling mode or in a maintenance mode.

In addition, the performance operator control apparatus further includes a plurality of drive components (e.g., solenoids) for driving the performance operators (e.g., keys) and an electrification abnormality detector for detecting the electrification abnormality with regard to the drive component, wherein upon the detection of the electrification abnormality, an abnormality detection signal is produced and used as a monitoring signal.

Furthermore, the performance operator control apparatus further includes a plurality of drive components for driving the performance operators, wherein the operator I/O control unit has an output port paired with the input port with respect to a plurality of channels so that drive data from the control unit circuit is supplied to the drive component via the output port so as to drive the performance operator, wherein the control unit circuit and the operator I/O control unit are connected together in a loop so that the physical parameters of the performance operator are included in serial data and are sent from the operator I/O control unit to the control unit circuit, and the drive data regarding the performance operator together with an inspection signal are included in serial data and are sent from the control unit circuit to the operator I/O control unit, wherein the operator I/O control unit outputs the drive data to the drive component via the output port in parallel, while the operator I/O control unit receives the physical parameters from the sensors via the input port in parallel, and wherein the control unit circuit produces the inspection signal based on information that is input into the input port of the operator I/O control unit and is sent thereto.

The aforementioned performance operator control apparatus allows multidimensional servo controls on one performance operator or plural performance operators by use of a relatively small number of signals, wherein it is capable of receiving monitoring signals during the execution of servo controls; in other words, it is capable of accurately making determination on abnormality in real time by use of a simple configuration. Since the control unit circuit and the operator I/O control unit are connected together in a loop, the physical parameters can be collectively sent from the operator I/O control unit to the control unit circuit in the form of serial data, and the drive data and inspection signals can be collectively sent from the control unit circuit to the operator I/O control unit in the form of serial data. This further simplifies the software; hence, it is possible to further reduce the burden of processing in the CPU and the like.

In a second aspect of the invention, a performance operator control apparatus comprises at least one performance operator; at least one drive component for driving the performance operator; a control unit circuit for performing calculations to produce drive data for driving the performance operator; and an operator I/O control unit that has a output port with respect to a plurality of channels, wherein the drive data from the control unit circuit is sent to the drive component via the output port so as to drive the performance operator, and wherein at least one of the channels that is not assigned to the drive component is used to output an inspection signal via the output port.

In addition, it is possible to further include a temperature abnormality detector for detecting the abnormality of the temperature of the operator I/O control unit, wherein upon detection of the abnormality of the temperature, an inspection signal representing the abnormality of the temperature is output via the output port.

In a third aspect of the invention, a performance operator control apparatus includes at least one performance operator; a plurality of sensors that are attached to the performance operator so as to detect physical parameters regarding an operation of the performance operator; at least one drive component for driving the performance operator; a control unit circuit for performing calculations to produce drive data for driving the performance operator based on the physical parameters; and an operator I/O control unit that has a pair of an input port and an output port in connection with the drive component and the sensors of the performance operator with respect to a plurality of channels, wherein the drive data from the control unit circuit are sent to the drive component via the output port so as to drive the performance operator, and the physical parameters from the sensors are received by the input port and are then sent to the control unit circuit, wherein at least one of the channels that is not assigned to the performance operator is used as a loop connection channel for connecting together the input port and the output port, and wherein the control unit circuit outputs pre-inspection data to the operator I/O control unit in which the pre-inspection data are transferred via the input port of the operator I/O control unit with respect to the loop connection channel and are then supplied to the control unit circuit as post-inspection data, so that the control unit circuit performs an inspection on the operator I/O control unit through the comparison between the pre-inspection data and the post-inspection data.

In the above, the pre-inspection data from the control circuit unit is fed back to the input port from the output port with respect to the loop connection channel as the post-inspection data; then, the control unit circuit compares the pre-inspection data with the post-inspection data. Through the comparison, when the pre-inspection data and post-inspection data do not match each other, or when they differ from each other, it is possible to determine the occurrence of the abnormality in the operator I/O control unit. In addition, the control unit circuit performs communication with the operator I/O control unit via lines so as to drive and control the operator I/O control unit and the keyboard. Furthermore, the loop connection channel can be easily established by merely connecting the input port and output port because it is an unoccupied channel that is not assigned to the performance operator.

In addition, the output port of the operator I/O control unit performs digital-to-analog conversion on the pre-inspection data, while the input port of the operator I/O control unit performs analog-to-digital conversion on analog signals input thereto. That is, the pre-inspection data are converted into analog signals in the output port, and the analog signals are converted into the post-inspection data in the input port, whereby it is possible to detect the abnormality that occurs in the output port performing the digital-to-analog conversion and the input port performing the analog-to-digital conversion. Herein, it is possible to set a prescribed allowable range for the determination of the abnormality with respect to an error (or a difference) between the pre-inspection data and the post-inspection data.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

This invention will be described in further detail by way of examples with reference to the accompanying drawings.

1. First Embodiment

Figure 1:
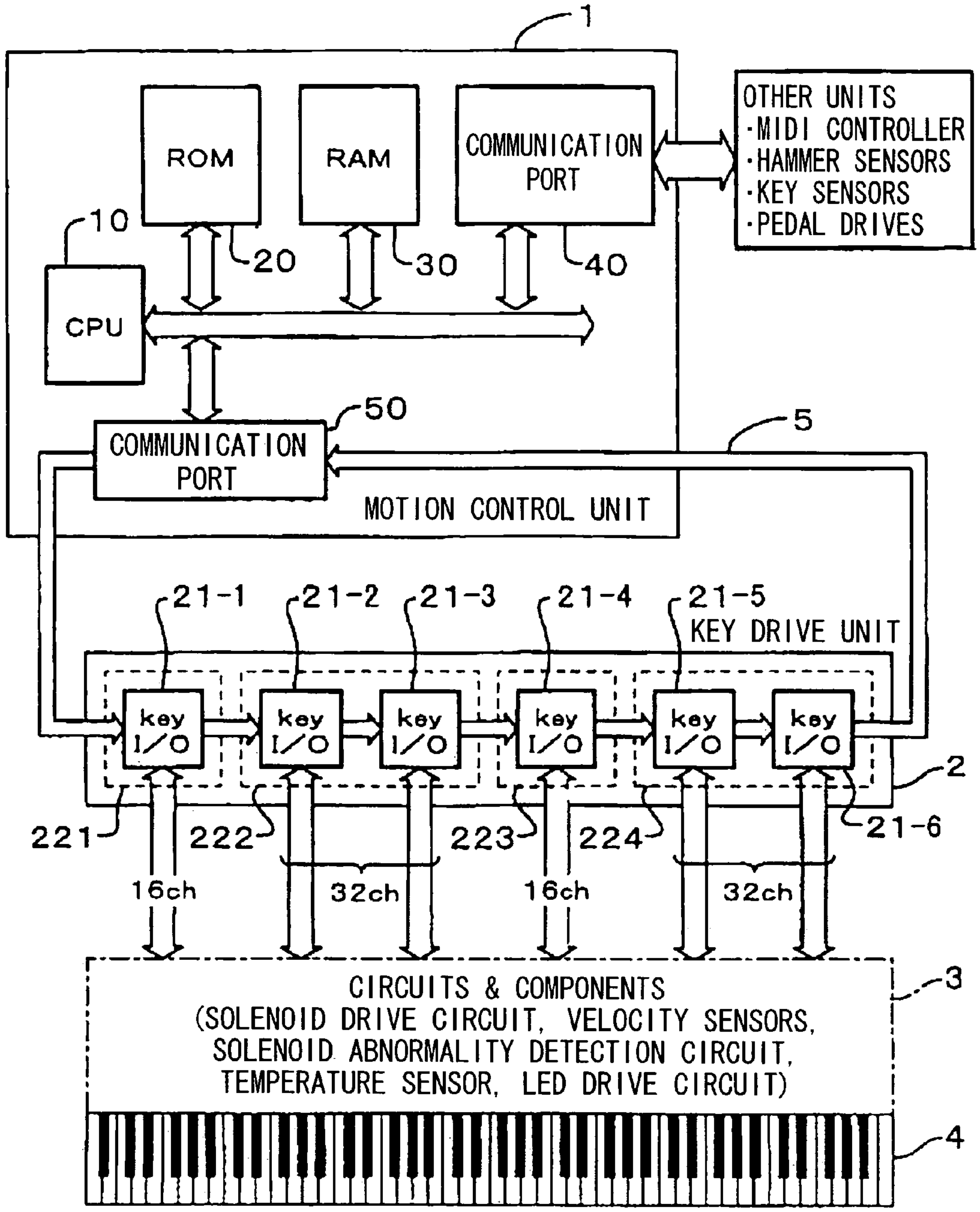
FIG. 1 is a block diagram showing essential parts of a player piano incorporating a performance operator control apparatus in accordance with a first embodiment of the invention.

FIG. 1 is a block diagram showing essential parts of a player piano adopting a performance operator control apparatus in accordance with a first embodiment of the invention. The player piano of FIG. 1 is equipped with a keyboard 4 having eighty-eight keys (including white keys and black keys), which correspond to performance operators in this invention. A motion control unit 1, which serves as a control unit circuit and is basically configured by a digital signal processor (i.e., DSP), comprises a CPU 10, a ROM 20, a RAM 30, a first communication port 40, and a second communication port 50. The CPU 10 executes programs stored in the ROM 20 so as to perform drive controls on the respective keys of the keyboard 4 in an automatic performance mode (or an auto-play mode). The first communication port 40 performs data input/output operations on other circuits and units, wherein it receives performance data, namely, MIDI data (based on the "Musical Instrument Digital Interface" standard), from a MIDI controller in the automatic performance mode. In addition, it is also used to receive outputs of hammer sensors and key sensors and to perform pedal drive control in the automatic performance mode.

The second communication port 50 performs data input/output operations with a key drive unit 2 (serving as an operator I/O control unit . The key drive unit 2 comprises a plurality of key I/O control ICs (denoted as "key I/O") 21-1, 21-2, 21-3, 21-4, 21-5, and 21-6 for controlling the keys of the keyboard 4. Specifically, the key I/O control IC 21-1 is attached to a first board 221; the key I/O control ICs 21-2 and 21-3 are attached to a second board 222; the key I/O control IC 21-4 is attached to a third board 223; and the key I/O control ICs 21-5 and 21-6 are attached to a fourth board 224. The motion control unit 1 (particularly, the second communication port 50) and the key drive unit 2 (comprising the key I/O control ICs 21-1 to 21-6) are connected together in a loop via a serial bus 5. All the key I/O control ICs 21-1 to 21-6 have substantially the same circuit configuration, which inputs and receives various signals with respect to various circuit elements '3' incorporated in the keyboard 4. As the circuit elements 3, it is possible to list solenoid drive circuits (for driving keys), velocity sensors for detecting velocities of plungers of solenoids, solenoid abnormality detection circuits for detecting 'abnormal' electrification of solenoids, temperature sensors for detecting the temperature of the key drive unit 2 (i.e., operator I/O control unit), and LED drive circuits for driving LEDs (i.e., light-emitting diodes) making alerts upon detection of the abnormality. The solenoid abnormality detection circuit can be configured similarly to one disclosed in Japanese Patent Application Publication No. H05-152127; hence, the detailed description thereof will be omitted.

Figure 2:
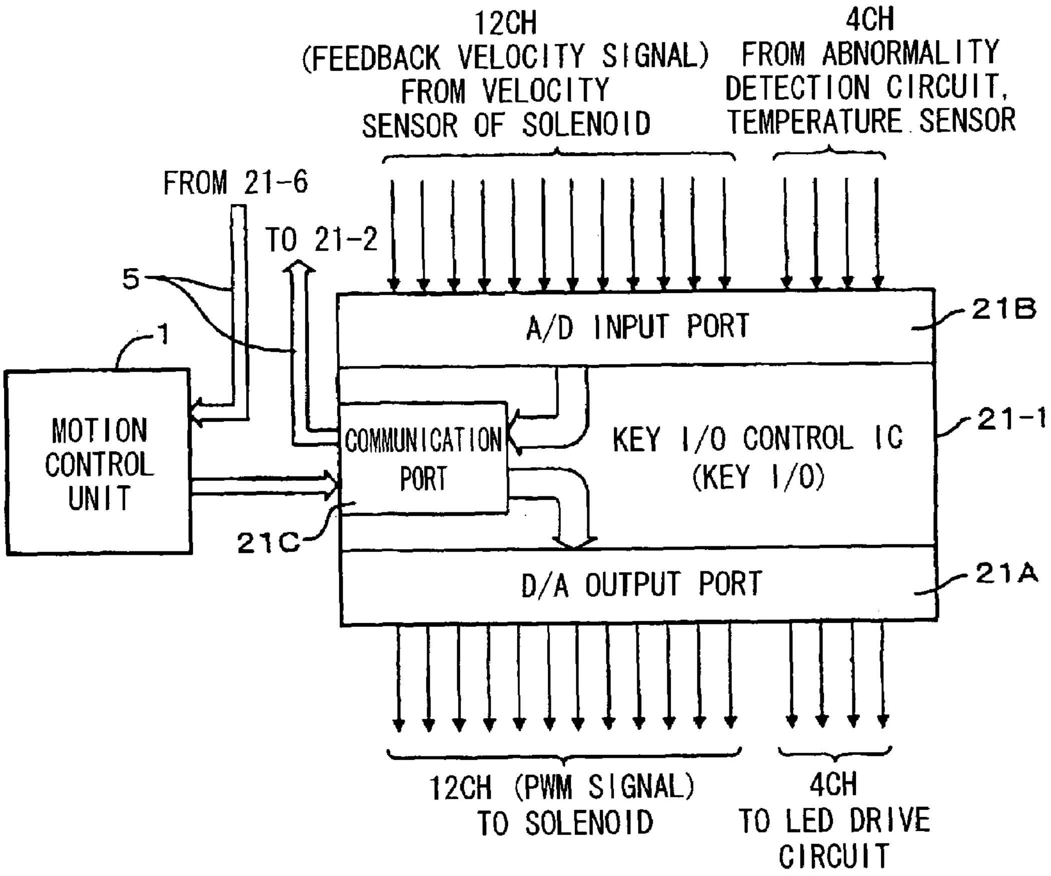
FIG. 2 is a simplified block diagram showing the details of a key I/O control IC incorporated in a key drive unit of the player piano shown in FIG. 1.

FIG. 2 shows the details of the key I/O control IC 21 (representing each of the aforementioned ICs 21-1 to 21-6), wherein the 'first' key I/O control IC 21-1 is connected with the motion control unit 1. That is, the key I/O control IC 21 comprises a D/A output port 21A having sixteen channels (or sixteen output ports) and an A/D input port 21B having sixteen channels (or sixteen input ports). In addition, it also comprises a communication port 21C for performing 'serial' input/output operations with the motion control unit 1 (particularly, the second communication port 50) or with the other key I/O control IC. Specifically, the communication port 21C serially inputs drive signals for driving plural keys (e.g., twelve keys in the case of the first key I/O control IC 21-1 shown in FIG. 2) and LED drive signals (which are supplied to the LED drive circuits). In addition, it serially outputs signals of velocity sensors, abnormality detection signals of abnormality detection circuits, and temperature detection signals of temperature sensors.

The D/A output port 21A performs digital-to-analog conversion (i.e., D/A conversion) on digital data (i.e., sixteen bits per each channel) serially input thereto, so that digital data are converted into analog signals, which are output in parallel with respect to sixteen channels. The A/D input port 21B performs analog-to-digital conversion (i.e., A/D conversion) on analog signals supplied thereto in parallel, so that analog signals are converted into digital data, which are processed in a serial form and are then output to the other key I/O control IC or the motion control unit 1. Herein, the keyboard drive control in the automatic performance mode is performed as similar to the conventional player piano in such a way that the D/A output port 21A performs D/A conversion on digital data for driving solenoids, which are supplied from the motion control unit 1 with respect to sixteen channels, so as to produce drive signals (i.e., pulse-width modulated signals or PWM signals), which are then output to the solenoid drive circuits in parallel. In addition, the A/D input port 21B performs A/D conversion on 'analog' velocity signals from velocity sensors attached to solenoids, thus producing digital data, which are then sent to the motion control unit 1. Velocity signals are used for feedback controls on solenoids. Specifically, in the case of the first key I/O control IC 21-1, velocity signals of twelve channels and temperature detection signals of four channels are processed into 'serial' digital data (i.e., 16-bit×16ch=256 bits), which are then sent to the motion control unit 1 via the other key I/O control ICs 21-2 to 21-6. With respect to the key I/O control ICs 21-1 to 21-6, there are provided six sets of digital data of 256 bits, all of which are processed into a serial form so as to realize a data length of 1536 bits.

The present embodiment performs data communication between the motion control unit 1 and the key drive unit 2 in the automatic performance mode as follows:

In a single transmission time slot, the CPU 10 of the motion control unit 1 produces data for all channels with respect to each of the D/A output ports of the key I/O control ICs 21-1 to 21-6, thus making setup of the data in the key drive unit 2. Thus, solenoids corresponding to the designated keys are adequately driven, and the prescribed processing is performed in response to inspection signals. In addition, monitoring signals and velocity signals of solenoids are supplied to each of the A/D input ports of the key I/O control ICs 21-1 to 21-6, wherein they are subjected to the A/D conversion to produce digital data, which are then received by the CPU 10 of the motion control unit 1 in a single reception time slot.

FIG. 2 shows that each of the 16-channel D/A output port 21A and the 16-channel A/D input port 21B is divided into two sections, that is, twelve channels (12 ch) and four channels (4ch). Herein, the twelve channels are assigned to twelve solenoids (or twelve keys) and velocity sensors and are denoted as "occupied channels" therefor, while the four channels are denoted as "unoccupied channels (or vacant channels)" to which none of the solenoid and velocity sensor is assigned. Inspection signals (details of which will be described later) are output from the unoccupied channels of the D/A output port 21B. In addition, the unoccupied channels of the A/D input port 21B inputs monitoring signals (details of which will be described later), wherein monitoring signals are converted into digital data, which are then sent to the motion control unit 1. Incidentally, channels of the D/A output port 21A will be referred to as "D/A output channels", and channels of the A/D input port 21B will be referred to as "A/D input channels".

The specific numbers of the occupied channels and unoccupied channels differs with respect to each of the key I/O control ICs 21-1 to 21-6. They can be summarized in Table 1 with respect to four boards 221 to 224 respectively.

TABLE 1

| | First Board 221 | Second Board 222 | Third Board 223 | Fourth Board 224 |
|---|---|---|---|---|
| Hardware Channels (I/O) | 16ch | 32ch | 16ch | 32ch |
| Occupied Channels (I/O) | 12ch | 28ch | 16ch | 32ch |
| Unoccupied Channels (I/O) | 4ch | 4ch | 0ch | 0ch |

That is, as shown in FIG. 2, the first key I/O control IC 21-1 attached to the first board 221 has sixteen channels consisting of 'occupied' twelve channels and 'unoccupied' four channels. The second and third key I/O control ICs 21-2 and 21-3 attached to the second board 222 have totally thirty-two channels consisting of 'occupied' twenty-eight channels and 'unoccupied' four channels. The fourth key I/O control IC 21-4 attached to the third board 223 has sixteen channels, all of which are 'occupied' so that no channel is 'unoccupied'. The fifth and sixth key I/O control ICs 21-5 and 21-6 attached to the fourth board 224 have totally thirty-two channels, all of which are 'occupied' so that no channel is 'unoccupied'. Totally, the four boards 221-224 provide eighty-eight 'occupied' channels in correspondence with eighty-eight keys of the keyboard 4. In addition, they provide eight 'unoccupied' channels (i.e., eight A/D input channels) for inputting monitoring signals, and they provide eight 'unoccupied' channels (i.e., eight D/A output channels) for outputting inspection signals.

Details of the monitoring signals input into the corresponding key I/O control ICs and the inspection signals output from the corresponding key I/O control ICs are as follows:

In the present embodiment, the key I/O control ICs input abnormality detection signals, representing the electrification abnormality of solenoids detected by solenoid abnormality detection circuits, as monitoring signals. In addition, they also input temperature detection signals detected by temperature sensors, which are fixed to prescribed positions of the key drive unit 2, as monitoring signals. It is possible for them to further input voltage detection signals (representing the detection result of the drive power source for driving solenoids) and operator signals (representing the user's manual operation on performance operators) as monitoring signals. Furthermore, in the present embodiment, the key I/O control ICs output LED drive signals (for driving LEDs upon the detection of the abnormality of electrification regarding solenoids and upon the detection of the abnormality of temperature regarding the key drive unit 2) as inspection signals.

It is possible to send various types of sensor signals output from keyboard sensors such as key sensors and hammer sensors, which are arranged in the keyboard 4, and other sensor signals given from pedal sensors to the motion control unit 1, wherein the sensor signals are stored in a hard-disk unit and the like connected with the motion control unit 1 via a bus, so that they are output as inspection signals for maintenance, for example. In addition, it is possible to use other data representing control values for controlling various circuits and devices of the player piano as inspection signals. It is possible to use all the eight unoccupied channels so as to provide eight types of monitoring signals and inspection signals; it is also possible to use the prescribed number of channels within the eight unoccupied channels for the reception and transmission of monitoring signals and inspection signals.

The player piano of the present embodiment is designed such that the operator I/O control unit (i.e., key drive unit 2) comprises a plurality of ICs (i.e., key I/O control ICs 21) having plural input/output ports (each consisting of sixteen channels), wherein the prescribed number of ICs are arranged to provide the prescribed number of I/O ports, which exceeds the total number of keys (i.e., eighty-eight keys) of the keyboard 4, so that a certain number of channels of the ICs remains as unoccupied channels that are not assigned to keys. The aforementioned ICs each having substantially the same specification are used to cope with different types of player pianos (having different numbers of keys), wherein the number of ICs is adequately set in response to the number of keys. Therefore, the basic design and configuration of the present embodiment can be applied to different types of player pianos except that the number of ICs should be adequately determined.

Figure 3:
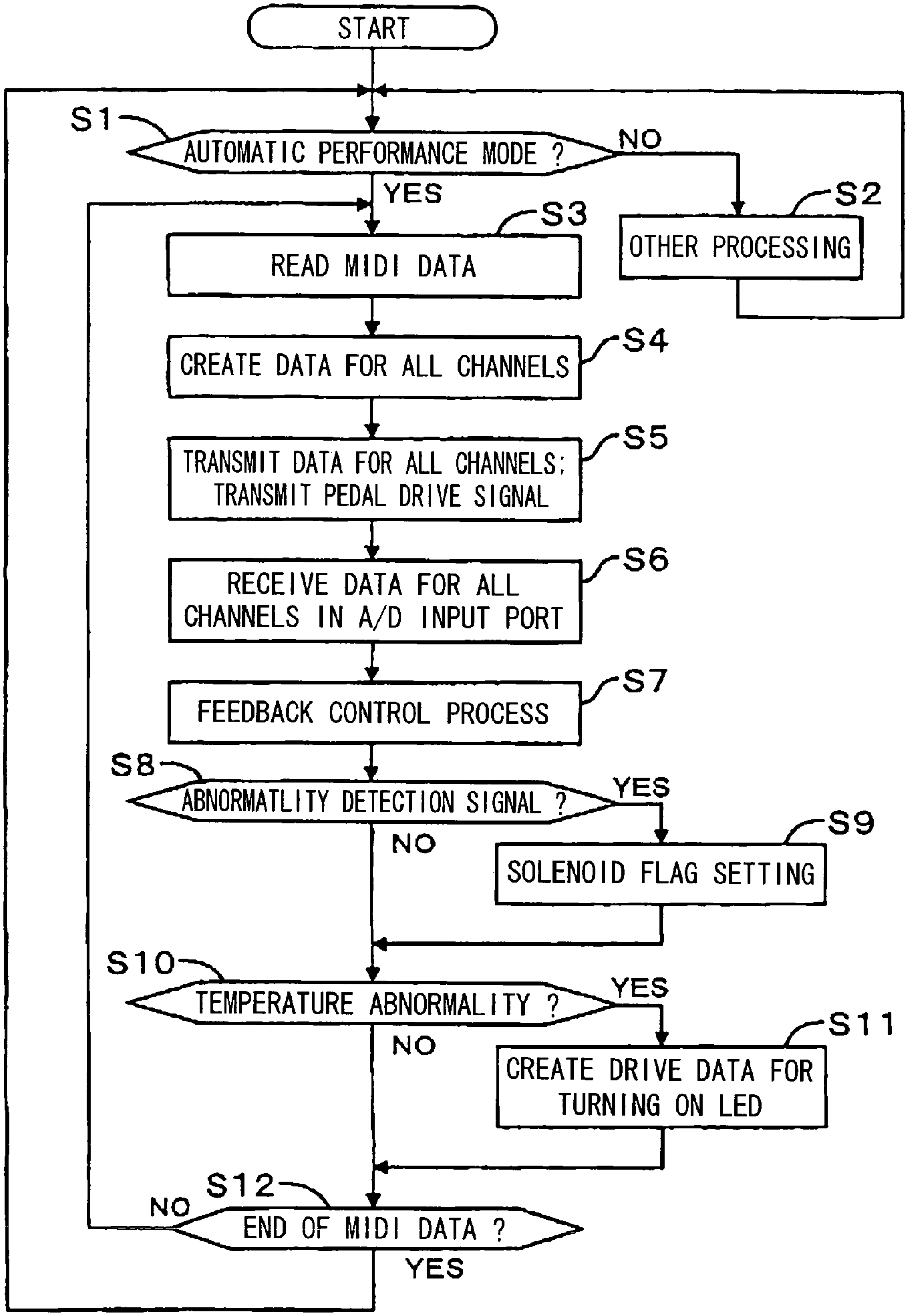
FIG. 3 is a flowchart showing a control program executed by a CPU of a motion control unit shown in FIG. 1.

FIG. 3 is a flowchart showing essential steps of a control program executed by the CPU 10 of the motion control unit 1, by which a series of control operations will be described in detail.

First, the flow proceeds to step S1 in which a decision is made as to whether or not an automatic performance mode is designated. If the automatic performance is not designated, the flow proceeds to step S2 in which the CPU 10 performs other processing. In the automatic performance mode, the CPU 10 performs processing in accordance with prescribed clock cycles. In step S3, MIDI data from the MIDI controller (see FIG. 1, that is, performance data and event data) are read from a prescribed buffer (not shown). In step S4, the CPU 10 creates data for all channels including drive signals for driving designated keys based on the MIDI data. In step S5, the created data are sent to the key drive unit 2, and pedal drive signals are output from the first communication port 40 to the other unit (see FIG. 1).

In step S6, the CPU 10 receives data regarding all the A/D input channels from the key drive unit 2. In step S7, the CPU 10 performs feedback control processing on solenoids in response to velocity signals. In step S8, a decision is made as to whether or not inspection signals (within the received data) include an abnormality detection signal (representing the electrification abnormality of a solenoid). When such an abnormality detection signal is included, the CPU 10 sets up a certain flag and the like so as to inhibit the corresponding solenoid from being electrified in step S9. Such solenoid flag set information is used to prevent the corresponding solenoid from being driven when the CPU 10 creates transmitting data for the key drive unit 2 (see step S4).

In step S10, a decision is made as to whether or not the temperature abnormality occurs on the basis of temperature detection signals within the received data. When the temperature abnormality is detected, the flow proceeds to step S11 in which the CPU 10 creates data for turning on the prescribed LED. Such LED drive data are included in the transmitting data for all channels of the key drive unit 2, which are created in step S4, by designating certain unoccupied D/A output channels. In step S12, a decision is made as to whether or not the CPU 10 detects the end of the MIDI data transmitted thereto. Thereafter, the CPU 10 repeats the aforementioned steps counted from step S3 unless it detects the end of the MIDI data.

The CPU 10 repeatedly performs the aforementioned steps (i.e., steps S3 to S12) in each clock period, so that the player piano plays automatic performance based on MIDI data, wherein upon detection of abnormality, the player piano automatically stops driving the corresponding solenoid or turns on the LED indicating the temperature abnormality. In addition, it is possible to arrange indicators and the like with respect to keys to cope with the detection of the electrification abnormality of the corresponding solenoids.

In a maintenance mode, when keys are driven based on MIDI data, or when the keyboard 4 is manually performed by the user, the motion control unit 1 inputs various sensor signals from the keyboard sensors such as the key sensors and hammer sensors, wherein the sensor signals are output from the 'unoccupied' D/A output channels of the key I/O control ICs 21-1 to 21-3 as inspection signals. By examining the inspection signals, it is possible to make determination as to whether or not various parts of the player piano operate normally.

In the above, the present embodiment is described such that the channel configuration of the key drive unit 2 is determined with reference to Table 1. Of course, it is possible to adequately change the channel configuration of the key drive unit 2. For example, it is possible to adopt the channel configuration as shown in Table 2.

TABLE 2

| | First Board 221 | Second Board 222 | Third Board 223 | Fourth Board 224 |
|---|---|---|---|---|
| Hardware | | | | |
| Input Channels | 16ch | 0ch | 16ch | 0ch |
| Output Channels | 16ch | 32ch | 16ch | 32ch |
| Occupied | | | | |
| Input Channels | 0ch | 0ch | 0ch | 0ch |
| Output Channels | 12ch | 32ch | 12ch | 32ch |
| Unoccupied | | | | |
| Input Channels | 16ch | 0ch | 16ch | 0ch |
| Output Channels | 4ch | 0ch | 4ch | 0ch |

The content of Table 2 is determined such that the hardware configurations of the key I/O control ICs attached to the first and third boards 221 and 223 are each identical to the hardware configuration shown in FIG. 2, whereas the key I/O control ICs attached to the second and fourth boards 222 and 224 are each designed not to comprise the A/D input port. That is, it is applied to a specific type of the player piano (or an inexpensive type of the player piano compared with the player piano corresponding to Table 1) in which solenoid feedback control is not performed. In this type of the player piano, the key I/O control ICs attached to the first and third boards 221 and 223 provide in total eight unoccupied D/A output channels for outputting inspection signals.

Incidentally, the present embodiment can be modified in a variety of ways within the scope of the invention. That is, the present embodiment is designed such that each key I/O control IC has sixteen channels, whereas it is possible to use other types of ICs having different numbers of channels. For example, when the key drive unit 2 is designed using other key I/O control ICs each having twelve channels, it is necessary to provide eight ICs to cope with eighty-eight keys of the keyboard 4, wherein it is possible to provide in total eight unoccupied channels (i.e., 12×8−88=8), which can be used for inputting monitoring signals and for outputting inspection signals. The number of keys incorporated in the keyboard 4 is not necessarily limited to eighty-eight; hence, it is possible to use other types of keyboards that can allow key I/O control ICs to provide the prescribed number of unoccupied channels.

Monitoring signals are not necessarily limited to those used in the present embodiment. It is possible to use distance detection signals for detecting the distance (or position) of the keyboard in its height direction in the maintenance mode or in the assembling mode. In addition, distance information regarding distance detection signals can be output as inspection signals.

The present embodiment is designed to output inspection signals, whereas this invention is not necessarily designed to output inspection signals, that is, this invention requires at least monitoring signals input thereto.

The present embodiment is adapted to the player piano, whereas this invention is not necessarily limited to the player piano. That is, this invention can be applied to other types of keyboard instruments for performing key-touch controls and multidimensional performance control apparatuses using multidimensional performance operators such as joysticks that are operated to perform drive controls on musical performance. In the case of the multidimensional performance control apparatus, a plurality of channels are arranged to perform multidimensional control on musical performance wherein each single channel is used for detection and drive control on the performance operator in one dimension.

This invention can be applied to other types of automatic performance apparatuses (e.g., an electronic orgel, or an electronic music box) driven by solenoids, other than the aforementioned player piano. The present embodiment teaches the feedback-control-type player piano having IN/OUT terminals each having the 32-channel configuration or 16-channel configuration realized by key I/O control ICs. Of course, this invention can be applied to other types of player pianos each having only the input channels, e.g., so-called performance data recording pianos and other electronic musical instruments that do not drive keys. In this case, it is possible to easily modify them to serve as feedback-control-type player pianos by externally providing ICs for outputting inspection signals and the like.

2. Second Embodiment

Figure 4:
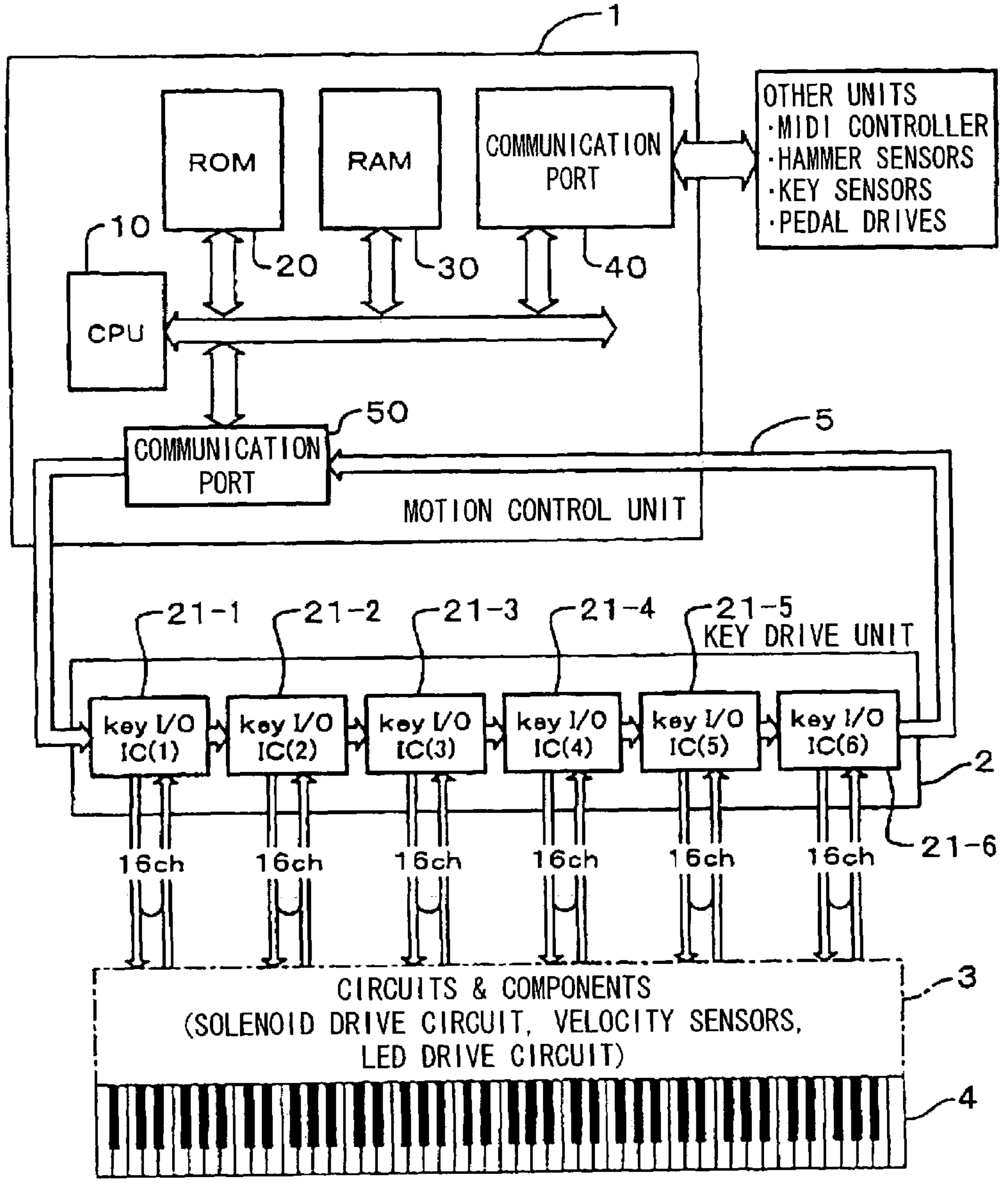
FIG. 4 is a block diagram showing essential parts of a player piano incorporating a performance operator control apparatus in accordance with a second embodiment of the invention.

Next, a player piano incorporating a performance operator control apparatus in accordance with a second embodiment of the invention will be described with reference to FIGS. 4 to 6, wherein parts and steps identical to those shown in FIGS. 1 to 3 are designated by the same reference numerals. The overall constitution of the player piano shown in FIG. 4 is basically identical to the overall constitution of the player piano shown in FIG. 4 except for the internal configuration and channel assignment of the key drive unit 2, which comprises the key I/O control ICs 21-1 to 21-6.

Figure 5:
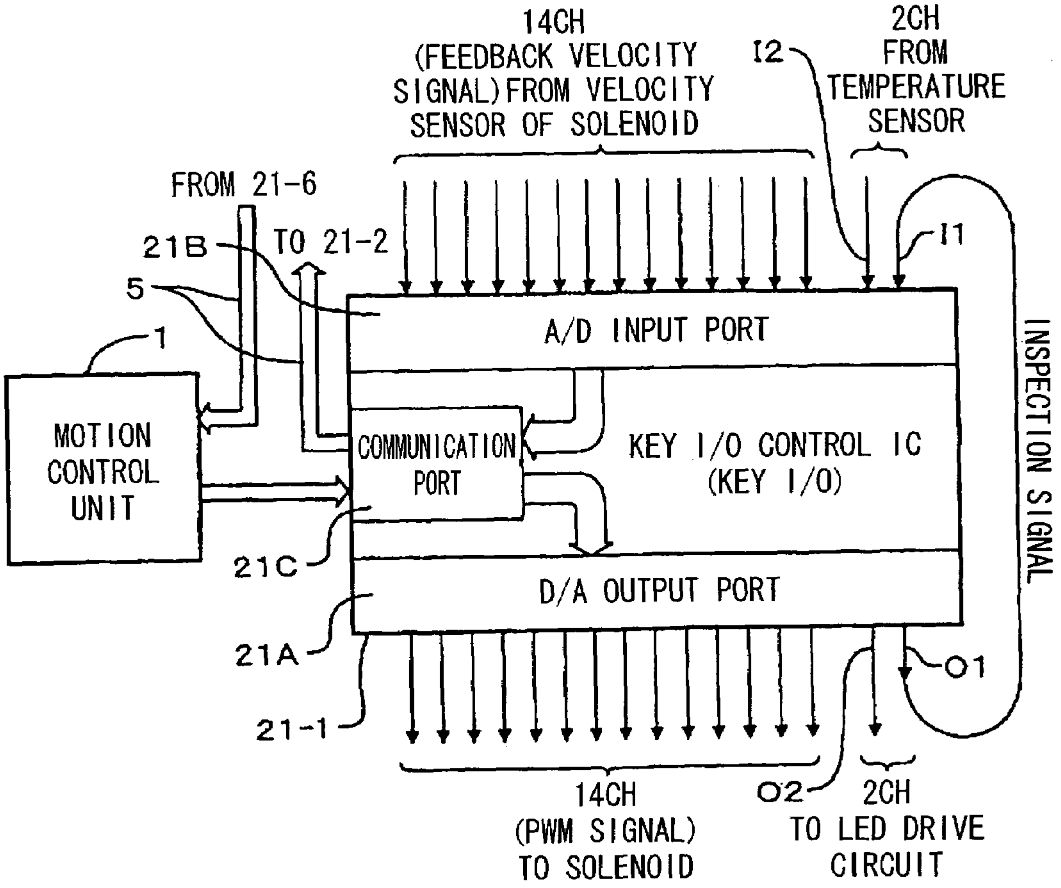
FIG. 5 is a simplified block diagram showing the details of a key I/O control IC incorporated in a key drive unit of the player piano shown in FIG. 4.

FIG. 5 shows the key I/O control IC 21-1 whose hardware configuration is basically similar to that of the key I/O control IC 21-1 shown in FIG. 2, wherein the 16-channel D/A output port 21A converts digital data (i.e., 16 bits per channel) serially input thereto into analog signals, which are output therefrom in parallel, and the 16-channel A/D input port 21B converts analog signals input thereto in parallel into digital data, which are sent to the motion control unit 1 or the other key I/O control IC via the communication port 21C. Herein, the communication port 21C of the key I/O control IC 21-1 outputs 'serial' digital data (i.e., 16 bits×16 channels=256 bits) consisting of velocity signals of fourteen channels, a temperature detection signal of one channel from the temperature sensor, and post-inspection data of one channel to the motion control unit 1 via the other key I/O control ICs 21-2 to 21-6. Each of the key I/O control ICs 21-1 to 21-6 provides the aforementioned digital data of 256 bits, all of which are processed in a serial manner so as to realize a data length of 1536 bits.

The present embodiment performs data communication between the motion control unit 1 and the key drive unit 2 in an automatic performance mode as follows:

The CPU 10 of the motion control unit 1 creates data for all channels with regard to each of the D/A output ports of the key I/O control ICs 21-1 to 21-6 in a single transmission time slot, so that the created data are set to the key drive unit 2. Thus, solenoids corresponding to the designated keys are adequately driven; then, pre-inspection data are output from the key I/O control IC 21, and post-inspection data are input to the key I/O control IC 21. In addition, velocity signals of solenoids are supplied to each of the A/D input ports of the key I/O control ICs 21-1 to 21-6, wherein the velocity signals and the post-inspection data are subjected to the A/D conversion so as to produce digital data for all channels, which are received by the CPU 10 of the motion control unit 1 in a single reception time slot.

FIG. 5 shows that each of the D/A output port 21A and the A/D input port 21B is divided into two terminals, namely, a 14-channel (14 ch) terminal and a 2-channel (2 ch) terminal. That is, the fourteen input channels are assigned to velocity sensors of fourteen solenoids, and the fourteen output channels are assigned to fourteen solenoids, so that the key I/O control IC 21-1 has fourteen 'occupied' channels, whereas the solenoids and velocity sensors are not assigned to the remaining two channels, which are unoccupied. Herein, the unoccupied channels of the D/A output port 21A output inspection signals, and the unoccupied channels of the A/D input port 21B input monitoring signals, which are converted into digital data and are then sent to the motion control unit 1.

With respect to one of the two 'unoccupied' channels, an output terminal 'O1' of the D/A output port 21A is connected with an input terminal 'I1' of the A/D input port 21B in a loop. That is, in the key drive unit 2 (i.e., the operator I/O control unit), no key (or no performance operator) is assigned to the unoccupied channels, one of which forms a loop connection channel for connecting together the prescribed input terminal and the prescribed output terminal. The D/A output port 21A converts pre-inspection data from the motion control unit 1 into an analog signal, which is then output from the output terminal O1. This analog signal (i.e., an inspection signal) is supplied to the input terminal I1 of the A/D input port 21B, wherein it is converted into a digital signal, which is then sent to the motion control unit 1. With respect to another unoccupied channel, a temperature detection signal from the temperature sensor is input into an input terminal I2 of the A/D input port 21B, while a LED drive signal for driving a LED is output from an output terminal O2 of the D/A output port 21A.

Table 3 shows the hardware channel configuration adapted to the present embodiment as well as the numbers of the occupied channels and the numbers of the unoccupied channels with respect to the six key I/O control ICs 21-1 to 21-6 respectively.

TABLE 3

| | 21-1 | 21-2 | 21-3 | 21-4 | 21-5 | 21-6 |
|---|---|---|---|---|---|---|
| Hardware Channels (I/O) | 16ch | 16ch | 16ch | 16ch | 16ch | 16ch |
| Occupied Channels (I/O) | 14ch | 14ch | 15ch | 15ch | 15ch | 15ch |
| Unoccupied Channels (I/O) | 2ch | 2ch | 1ch | 1ch | 1ch | 1ch |

Table 3 shows that each of the key I/O control ICs 21-1 and 21-2 has fourteen occupied channels and two unoccupied channels as shown in FIG. 5, while each of the other key I/O control ICs 21-3 to 21-6 has fifteen occupied channels and one unoccupied channel. That is, the present embodiment provides in total eighty-eight occupied channels in correspondence with eighty-eight keys of the keyboard 4. In addition, the present embodiment also provides in total eight unoccupied channels. Within the eight unoccupied channels regarding the A/D input ports (hereinafter, simply referred to as A/D input channels), one channel of each key I/O control IC 21 is set as the loop connection channel for connecting the output terminal O1 and input channel I1 in a loop, which is used to input and output pre-inspection data with regard to each key I/O control IC 21. In addition, each of the key I/O control ICs 21-1 and 21-2 has the input terminal I2 for inputting a temperature detection signal and the output terminal O2 for outputting a LED drive signal. Incidentally, the pre-inspection data can be set to represent a certain value ranging from '1' to '127' in conformity with the normal MIDI data format, wherein this value can be subjected to the D/A conversion.

Figure 6:
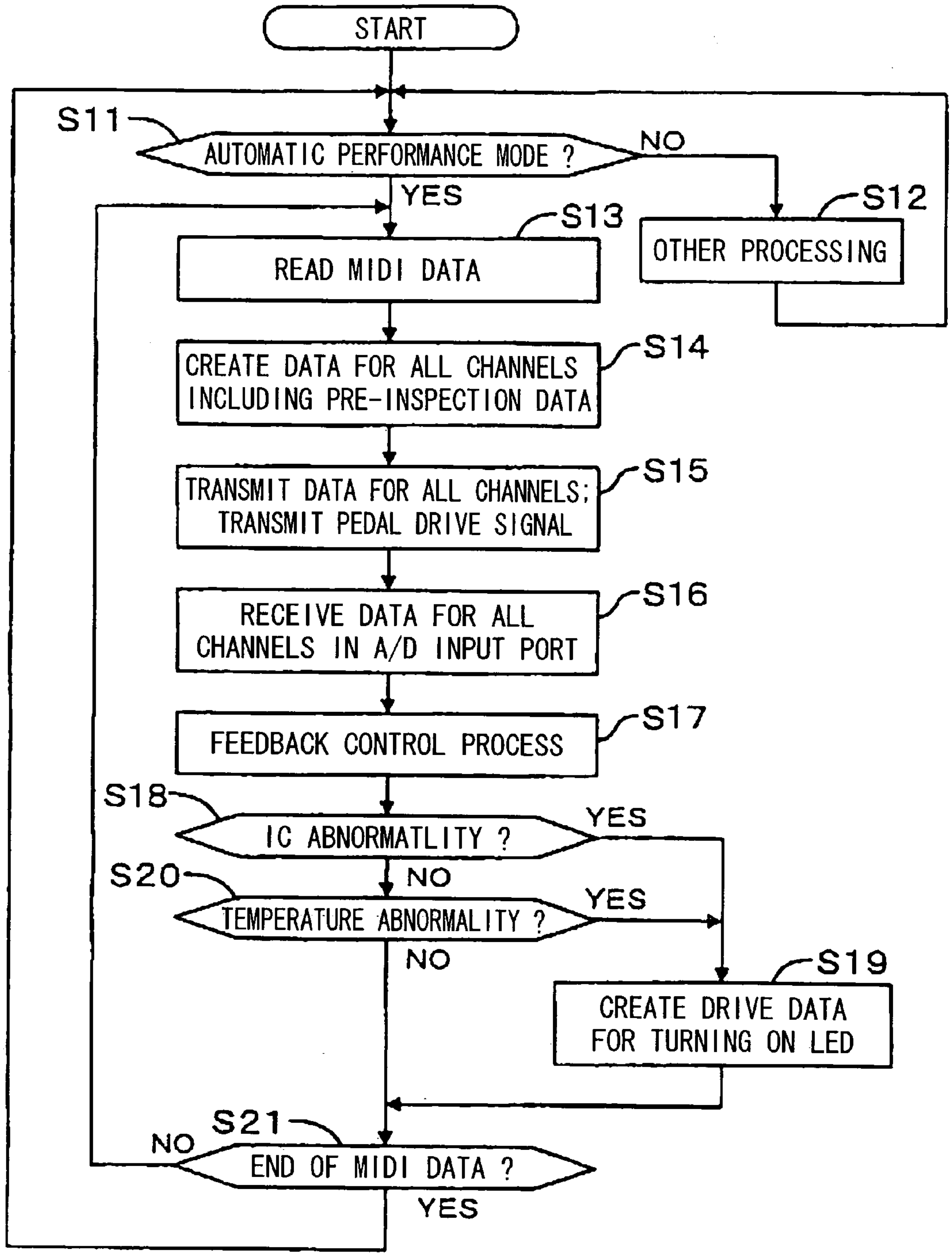
FIG. 6 is a flowchart showing a control program executed by a CPU of a motion control unit shown in FIG. 4.

FIG. 6 is a flowchart showing essential steps of a control program executed by the CPU 10 of the motion control unit 1 in accordance with the present embodiment.

First, the flow proceeds to step S11 in which a decision is made as to whether or not an automatic performance mode is designated. If the automatic performance is not designated, the flow proceeds to step S12 in which the CPU 10 performs other processing. In the automatic performance mode, the CPU 10 performs processing in accordance with prescribed clock cycles. In step S13, MIDI data from the MIDI controller (i.e., performance data and event data) are read from a prescribed buffer (not shown). In step S14, the CPU 10 creates data for all channels including drive signals for driving designated keys and pre-inspection data regarding the unoccupied channels based on the MIDI data. In step S15, the created data are sent to the key drive unit 2, and pedal drive signals are output from the first communication port 40 to the other unit.

In step S16, the CPU 10 receives data regarding all the A/D input channels from the key drive unit 2. In step S17, the CPU 10 performs feedback control processing on solenoids in response to velocity signals. In step S18, the pre-inspection data, which are previously output from the D/A output port 21A, are compared with post-inspection data included in the received data with respect to the loop connection channel, so that a decision is made as to whether or not the abnormality occurs in the key I/O control IC 21. That is, the CPU 10 detects the occurrence of the abnormality by making a decision as to whether or not an absolute value of the difference between the pre-inspection data and the post-inspection data belongs to a prescribed allowable range. For example, when the absolute value of the difference is '1' or '0' (which can be represented by one bit), the CPU 10 determines that the key I/O control IC 21 operates normally, whereas when it is '2' or more, the CPU 10 detects the occurrence of the abnormality with respect to the key I/O control IC 21. When a decision result of step S18 is "YES" representing the occurrence of the abnormality, the flow proceeds to step S19 in which the CPU 10 produces LED drive data for turning on the corresponding LED. Such LED drive data are included in the transmitting data for all channels of the key drive unit 2, which are created in step S14, by designating the unoccupied D/A output channel (i.e., output terminal O2). In step S20, a decision is made as to whether or not the temperature abnormality occurs based on the temperature detection signal included in the received data. When a decision result of step S20 is "YES" representing the occurrence of the temperature abnormality, the flow proceeds to step S19 in which the CPU 10 produces LED drive data for turning on the corresponding LED. In step S21, a decision is made as to whether or not the CPU 10 detects the end of the MIDI data transmitted thereto. Thereafter, the CPU 10 repeats the aforementioned steps counted from step S13 unless it detects the end of the MIDI data.

The CPU 10 repeatedly performs the aforementioned steps (i.e., steps S13 to S21) in each clock period, so that the player piano plays automatic performance based on MIDI data, wherein upon detection of the abnormality of the key I/O control IC 21, the corresponding LED is turned on to indicate the occurrence of the key I/O control IC 21. In addition, the present embodiment is also capable of indicating the occurrence of the temperature abnormality in the key drive unit 2.

The present embodiment can be modified in a variety of ways as follows:

The aforementioned allowable range for the determination of the abnormality of ICs is not necessarily limited to one described in conjunction with the present embodiment; hence, it can be adequately set in consideration of the required precision of the D/A conversion and A/D conversion.

The present embodiment is designed to detect the abnormality of ICs during an automatic performance mode, whereas it can be modified such that the abnormality is detected during a maintenance mode.

The present embodiment is designed such that a temperature detection signal of the temperature sensor incorporated in the key drive unit 2, which is input with respect to the 'unoccupied' A/D input channel, is used as a monitoring signal, whereas it can be modified such that abnormality detection signals representing the electrification abnormality of solenoids, voltage detection signals representing the detected voltage of a drive power source for driving solenoids, and operator manipulation signals representing the user's manipulation of performance operators can be used as monitoring signals. For example, sensor signals from keyboard sensors such as key sensors and hammer sensors installed in the keyboard and other sensor signals from pedal sensors are input into the motion control unit 1, wherein they are stored in a hard-disk unit connected with the motion control unit 1 via a bus and are then used as inspection signals in a maintenance mode. In addition, other control values set for various controls can be output to an external device and the like. The present embodiment at least requires input/output operations regarding pre-inspection data by use of the loop connection channel; hence, it is not always required to allow monitoring signals to input thereto.

The present embodiment is designed with reference to the aforementioned hardware channel configuration and input/output channel assignments as shown in Table 3, which can be adequately modified to realize the prescribed number of unoccupied channels. The present embodiment is designed using key I/O control ICs each having the 16-channel configuration, which can be changed as necessary. For example, when the key drive unit 2 is configured using other key I/O control ICs each having the 12-channel configuration, it is necessary to provide in total eight ICs to cope with eighty-eight keys, wherein it is possible to realize in total eight unoccupied channels (i.e., 12×8−88=8), which can be used for input/output operations regarding inspection signals. Of course, the total number of keys of the keyboard 4 adapted to the present embodiment is not necessarily limited to '88'; hence, the present embodiment can be easily modified to cope with any number of keys unless as long as the prescribed number of unoccupied channels can be realized using key I/O control ICs.

As this invention may be embodied in several forms without departing from the spirit or essential characteristics thereof, the aforementioned embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A performance operator control apparatus comprising:

at least one performance operator;

a plurality of sensors that are attached to the performance operator so as to detect physical parameters regarding an operation of the performance operator;

a control unit circuit for performing calculations to produce drive data for driving the performance operator based on the physical parameter; and an operator I/O control unit that is arranged independently of the control unit circuit and that has at least one input port connected with the plurality of sensors with respect to a plurality of channels, wherein the operator I/O control unit sends the physical parameters from the sensors to the control unit circuit, and wherein at least one channel of the input port that is not assigned to the performance operator is used to input a monitoring signal regarding the performance operator.

2. A performance operator control apparatus according to claim 1 further comprising at least one drive component for driving the performance operators based on the drive data and an electrification abnormality detector for detecting electrification abnormality with regard to the drive component, wherein upon detection of the electrification abnormality, the electrification abnormality detector produces an abnormality detection signal, which is used as the monitoring signal.

3. A performance operator control apparatus according to claim 1 further comprising at least one drive component for driving the performance operator based on the drive data, wherein the operator I/O control unit has an output port paired with the input port with respect to the plurality of channels so that the drive data from the control unit circuit is supplied to the drive component via the output port so as to drive the performance operator, wherein the control unit circuit and the operator I/O control unit are connected together in a loop so that the physical parameters of the performance operator are included in serial data and are sent from the operator I/O control unit to the control unit circuit, and the drive data regarding the performance operator together with an inspection signal are included in serial data and are sent from the control unit circuit to the operator I/O control unit, wherein the operator I/O control unit outputs the drive data to the drive component via the output port in parallel, while the operator I/O control unit receives the physical parameters from the sensors via the input port in parallel, and wherein the control unit circuit produces the inspection signal based on information that is input into the input port of the operator I/O control unit and is sent thereto.

4. A performance operator control apparatus comprising:

at least one performance operator;

at least one drive component for driving the performance operator;

a control unit circuit for performing calculations to produce drive data for driving the performance operator; and an operator I/O control unit that is arranged independently of each other and that has an output port with respect to a plurality of channels, wherein the drive data from the control unit circuit is sent to the drive component via the output port so as to drive the performance operator, and wherein at least one of the plurality of channels that is not assigned to the drive component is used to output an inspection signal via the output port.

5. A performance operator control apparatus according to claim 4 further comprising a temperature abnormality detector for detecting abnormality of temperature of the operator I/O control unit, wherein upon detection of the abnormality of temperature, an inspection signal representing the abnormality of temperature is output via the output port.

6. A performance operator control apparatus according to claim 4 further comprising a plurality of sensors for detecting physical parameters regarding operation of the performance operator so that the control unit circuit produces the drive data based on the physical parameters of the performance operator, wherein the operator I/O control unit has an input port paired with the output port with respect to the plurality of channels so that the drive data from the control unit circuit is supplied to the drive component via the output port so as to drive the performance operator, wherein the control unit circuit and the operator I/O control unit are connected together in a loop so that the physical parameters of the performance operator are included in serial data and are sent from the operator I/O control unit to the control unit circuit, and the drive data regarding the performance operator together with the inspection signal are included in serial data and are sent from the control unit circuit to the operator I/O control unit, wherein the operator I/O control unit outputs the drive data to the drive component via the output port in parallel, while the operator I/O control unit receives the physical parameters from the sensors via the input port in parallel, and wherein the control unit circuit produces the inspection signal based on information that is input into the input port of the operator I/O control unit and is sent thereto.

7. A performance operator control apparatus comprising:

at least one performance operator;

a plurality of sensors that are attached to the performance operator so as to detect physical parameters regarding an operation of the performance operator;

at least one drive component for driving the performance operator; a control unit circuit or performing calculations to produce drive data for driving the performance operator based on the physical parameters; and an operator I/O control unit that is arranged independently of the control unit circuit and that has a pair of an input port and an output port in connection with the drive component and the sensors of the performance operator with respect to a plurality of channels, wherein the drive data from the control unit circuit are sent to the drive component via the output port so as to drive the performance operator, and the physical parameters from the sensors are received by the input port and are then sent to the control unit circuit, wherein at least one of the channels that is not assigned to the performance operator is used as a loop connection channel for connecting together the input port and the output port, and wherein the control unit circuit outputs pre-inspection data to the operator I/O control unit in which the pre-inspection data are transferred via the input port of the operator I/O control unit with respect to the loop connection channel and are then supplied to the control unit circuit as post-inspection data, so that the control unit circuit performs an inspection on the operator I/O control unit through comparison between the pre-inspection data and the post-inspection data.

8. A performance operator control apparatus according to claim 7, wherein the output port of the operator I/O control unit performs digital-to-analog conversion on the pre-inspection data, while the input port of the operator I/O control unit performs analog-to-digital conversion on analog signals input thereto.

9. A performance operator control apparatus according to claim 7, wherein the control unit circuit and the operator I/O control unit are connected in a loop, wherein the physical parameters of the performance operator and the post-inspection data are included in serial data and are sent from the operator I/O control unit to the control unit circuit, wherein the drive data of the performance operator and the pre-inspection data are included in serial data and are sent from the control unit circuit to the operator I/O control unit, and wherein the drive data subjected to digital-to-analog conversion in the output port of the operator I/O control unit are sent to the drive component in parallel, and the input port of the operator I/O control unit receives the physical parameters and the post-inspection data prior to analog-to-digital conversion in parallel.

10. A performance operator control apparatus adapted to a player piano having a keyboard in which a plurality of keys are respectively driven using a plurality of drive components in association with a plurality of sensors, said performance operator control apparatus comprising:

a motion control unit that is associated with the plurality of sensors and the plurality of drive components; and a key drive unit that is connected together with the motion control unit in a loop, wherein the key drive unit comprises a plurality of key I/O control ICs each having an input port and an output port with respect to a plurality of channels, the input and output ports of the plurality of key I/O control ICs being connected in series, and wherein the total number of the channels over the plurality of key I/O control ICs is greater than the number of the keys arranged for the keyboard by a prescribed number of channels, which are not assigned to the keys and are used for detection and/or notification of abnormality with regard to at least one of the drive components and/or the keyboard.

11. A performance operator control apparatus according to claim 10, wherein the plurality of drive components correspond to a plurality of solenoids that are driven upon electrification so as to operate the plurality of keys respectively, and wherein electrification abnormality detected with regard to at least one drive component is monitored and notified using at least one of the prescribed number of channels.

12. A performance operator control apparatus according to claim 10, wherein at least one of the sensors is used to measure the temperature of the keyboard, so that temperature abnormality is monitored and notified using at least one of the prescribed number of channels.

* * * * *